United States Patent
French et al.

(10) Patent No.: US 10,325,288 B2
(45) Date of Patent: *Jun. 18, 2019

(54) ADVERTISING WITHIN SOCIAL NETWORKS (71) Applicant: International Business Machines Corporation, Armonk, NY (US)

(72) Inventors: Paul B. French, Cork (IE); Jack Healy, Cork (IE); Niall J. Lucey, Cork (IE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/843,175

(22) Filed: Sep. 2, 2015

(65) Prior Publication Data

US 2016/0086232 A1   Mar. 24, 2016

Related U.S. Application Data

(63) Continuation of application No. 14/490,704, filed on Sep. 19, 2014.

(51) Int. Cl.
| | | |
|---|---|---|
| *G06Q 30/02* | (2012.01) | |
| *G06Q 50/00* | (2012.01) | |
| *H04L 29/08* | (2006.01) | |
| *H04W 4/21* | (2018.01) | |
| *H04W 4/20* | (2018.01) | |

(52) U.S. Cl.
CPC ..... *G06Q 30/0269* (2013.01); *G06Q 30/0245* (2013.01); *G06Q 30/0264* (2013.01); *G06Q 50/01* (2013.01); *H04L 67/20* (2013.01); *H04L 67/306* (2013.01); *G06Q 30/0255* (2013.01); *H04W 4/206* (2013.01); *H04W 4/21* (2018.02)

(58) Field of Classification Search
CPC .................................. G06Q 30/0207–30/0277
USPC .............................................. 705/14.1–14.73
See application file for complete search history.

(56) References Cited

U.S. PATENT DOCUMENTS

| | | |
|---|---|---|
| 8,458,160 B2 | 6/2013 | Krishnamoorthy |
| 8,527,344 B2 | 9/2013 | Rosenthal |

(Continued)

FOREIGN PATENT DOCUMENTS

WO    2014027255 A1    2/2014

OTHER PUBLICATIONS

Appendix P, List of IBM Patents or Patent Applications Treated as Related, pp. 1-2, dated Sep. 3, 2015.

(Continued)

*Primary Examiner* — Sam Refai
(74) *Attorney, Agent, or Firm* — Aaron N. Pontikos (57) ABSTRACT

An online social network is provided. A sentiment is determined for each of a plurality of users of an online social network (OSN) in relation to a first product. A category is determined for each of the plurality of users based, at least in part, on the sentiment of each of the plurality of users, respectively. A group including a first user and a second user of the plurality of users is generated based, at least in part, on the category of each of the first user and the second user and a relationship within the OSN between the first user and the second user. An advertisement is presented to the first user. An indication is presented to the first user that the advertisement is also presented to the second user.

5 Claims, 3 Drawing Sheets

(56) References Cited

U.S. PATENT DOCUMENTS

| | | | |
|---|---|---|---|
| 2009/0171748 A1 | 7/2009 | Aven et al. | |
| 2010/0088154 A1* | 4/2010 | Vailaya | G06Q 10/04 705/7.29 |
| 2010/0332330 A1 | 12/2010 | Goel et al. | |
| 2011/0320250 A1* | 12/2011 | Gemmell | G06Q 30/02 705/14.16 |
| 2013/0290109 A1 | 10/2013 | Jamal et al. | |

OTHER PUBLICATIONS

Callari, "Flip.to Identifies Net Promoters & Streamlines Reviews on Hotel Websites", pp. 1-10, Copyright © 2006-2014. Halcyon Solutions Inc., <http://inventorspot.com/articles/flipto_identifies_net_promoters_streamlines_reviews_hotel_websit>.

Steel, "Visa's Blueprint for Targeted Advertising Digits Tech News & Analysis From the WSJ", dated Oct. 24, 2011, pp. 1-6, Copyright © 2014 Dow Jones & Company, Inc., <http://blogs.wsj.com/digits/2011/10/24/visas-blueprint-for-targeted-advertising/?mg=blogs-wsj>.

"Impression (online media)", From Wikipedia, the free encyclopedia, pp. 1-3, This page was last modified on May 18, 2014 at 17:28, Wikipedia® is a registered trademark of the Wikimedia Foundation, Inc., <http://en.wikipedia.org/wiki/Impression_(online_media)>.

"Net Promoter System", Measuring your Net Promoter Score—Bain & Company: Net Promoter System, pp. 1-5, © 1996-2013. Bain & Company, <http://www.netpromotersystem.com/about/measuring-your-net-promoter-score.aspx>.

Authors et. al.: Disclosed Anonymously, "Candidate Advertisement ranking based on Net-Promoter-Score of Frictionless-Sharing Contacts", IP.com No. IPCOM000230098D, IP.com Electronic Publication: Aug. 19, 2013, pp. 1-4.

French et al., "Advertising Within Social Networks", U.S. Appl. No. 14/490,704, filed Sep. 19, 2014, pp. 1-34.

Haggerty, A., "Google announces 'Shared Endorsements' feature similar to Facebook's Sponsored Stories", Thedrum, Jan. 12, 2014, 10:16am, 6 pages, <http://www.thedrum.com/news/2014/01/12/google-announces-shared-endorsements-feature-similar-facebooks-sponsored-stories>.

* cited by examiner

ADVERTISING WITHIN SOCIAL NETWORKS

BACKGROUND OF THE INVENTION

The present invention relates generally to the field of social media, and more particularly to advertising within a social network.

An online social network (OSN) is a platform that allows users to build relationships with other users of the OSN who share interests, activities, backgrounds, or real-life connections. Certain social networks allow a user to create a user profile, by which the user provides individual content via the OSN. Users share content with other users of the OSN including but not limited to, text, audio, video, or image content. Additionally, an OSN allows a user to control the amount of personal content of the user that is accessible by other users of the OSN. Furthermore, users have the ability to suggest certain content to other users within the OSN. Some OSNs are internet-based services accessible to users who are physically located in different, and potentially distant, geographic locations.

Online advertising is a form of advertising that uses the Internet to deliver promotional marketing messages to consumers. Some common forms of online advertising include email marketing, search engine marketing, social media marketing, display advertising, web banner advertising, and mobile advertising. Online advertising typically involves both a publisher, who integrates advertisements into its online content, and an advertiser, who provides the advertisements to be displayed on the publisher's content. Online advertising is widely used across many industries.

Sentiment analysis refers to the use of natural language processing, text analysis, and computational linguistics to identify and extract subjective information in source materials. Sentiment analysis aims to determine the attitude or opinion of a speaker or writer in relation to some event, topic or overall contextual polarity of a document. The attitude is an affective state, an evaluation, a judgment, an intended emotional communication, an opinion, or any other identifier.

SUMMARY

According to one embodiment of the present disclosure, a method for advertising within a social network is provided. The method includes determining, by one or more computer processors, a sentiment of each of a plurality of users of an online social network (OSN) in relation to a first product; determining, by one or more computer processors, a category of each of the plurality of users based, at least in part, on the sentiment of each of the plurality of users, respectively; generating, by one or more computer processors, a group including a first user and a second user of the plurality of users based, at least in part, on the category of each of the first user and the second user and a relationship within the online social network (OSN) between the first user and the second user; presenting, by one or more computer processors, an advertisement to the first user; and presenting, by one or more processors, an indication to the first user that the advertisement is also presented to the second user.

According to another embodiment of the present disclosure, a computer program product for advertising within a social network is provided. The computer program product comprises a computer readable storage medium and program instructions stored on the computer readable storage medium. The program instructions include program instructions to determine a sentiment of each of a plurality of users of an online social network (OSN) in relation to a first product; program instructions to determine a category of each of the plurality of users based, at least in part, on the sentiment of each of the plurality of users, respectively; program instructions to generate a group including a first user and a second user of the plurality of users based, at least in part, on the category of each of the first user and the second user and a relationship within the online social network (OSN) between the first user and the second user; program instructions to present an advertisement to the first user; and program instructions to present an indication to the first user that the advertisement is also presented to the second user.

According to another embodiment of the present disclosure, a computer system for advertising within a social network is provided. The computer system includes one or more computer processors, one or more computer readable storage media, and program instructions stored on the computer readable storage media for execution by at least one of the one or more processors. The program instructions include program instructions to determine a sentiment of each of a plurality of users of an online social network (OSN) in relation to a first product; program instructions to determine a category of each of the plurality of users based, at least in part, on the sentiment of each of the plurality of users, respectively; program instructions to generate a group including a first user and a second user of the plurality of users based, at least in part, on the category of each of the first user and the second user and a relationship within the online social network (OSN) between the first user and the second user; program instructions to present an advertisement to the first user; and program instructions to present an indication to the first user that the advertisement is also presented to the second user.

DETAILED DESCRIPTION

Embodiments of the present disclosure recognize that social network utilities are an integral portion of an individual's daily interactions, such as during personal or professional activities. Often times, businesses look to social media in order to promote their products or services in order to increase their clientele. Increased online exposure can lead to improved sales of a service or product. Embodiments of the present disclosure recognize that many OSNs encourage advertising. Embodiments of the present disclosure provide improved advertising by grouping users of a social network based on a plurality of factors that, alone or in combination, suggest the extent to which each user is more likely to recommend or detract from a product or service. For example, the plurality of factors includes expressed sentiments of each OSN user in relation to a product or service. In another example, users having a consistent history of purchasing a product or service, or even products or services under the same brand or seller are determined to be more likely to recommend rather than detract. In yet another example, users who bought a product, but returned it quickly (i.e., within a specified time period), are determined more likely to detract than to recommend. Embodiments of the present disclosure provide drawing inferences based on user behavior (e.g., the user behavior mentioned in one or more of the preceding examples). For example, a person has owned a vehicle for three and a half years and has a pattern of buying a new vehicle every four years. Based on this user behavior, an inference is drawn that the user is considering the purchase of a new vehicle.

Embodiments provide utilizing a score of the likelihood of recommendation or detraction of a user for a product. This score is a promotion/detraction likelihood score for a product. For example, Net Promoter Score (NPS) is a known methodology for measuring customer loyalty. The main idea of the methodology is that customer loyalty can best be predicted by the answer to a single question: "How likely are you to recommend (company name/product) to a friend or colleague?". Respondents answer on a scale of zero (not at all likely) to ten (extremely likely). Based on the response to this question, respondents are categorized as Promoters (9-10), Passives (7-8) or Detractors (0-6). A Net Promoter Score of a product or company is the percentage of Promoters minus the percentage of Detractors.

Many companies believe and invest in improving their Net Promoter Score as a means to becoming more successful and customer-focused. This belief is based on the assumption that the more individuals who say they are "likely to recommend a company/product to a friend or colleague", the more successful the product is likely to be. Embodiments recognize that an impartial personal recommendation improves success for a product. Further, a good Net Promoter Score increases the likelihood of impartial recommendations, so there is incentive to improving the Net Promoter Score of a company or product. Alternatives to the Net Promoter Score include the Net Endorser score of the Company Health Check Index of Red Shift Research and other measures of likelihood of recommending or detracting from a product. Additionally, in some embodiments, a classic NPS (or equivalent) is not available and an estimated score of the promotion/detraction likelihood score (estimated from other metrics about the relationship of the consumer with the company and/or product) is used. The term "Net Promoter", "Net Promoter Score", "NPS", "Net Endorser", "Net Endorser" and the like may be subject to trademark rights in various jurisdictions throughout the world and are used here only in reference to the products or services properly denominated by the marks to the extent that such trademark rights may exist.

In one embodiment, the propensity to recommend, detract, or purchase is provided for by a separate system or server. For example, embodiments provide looking up a Net Promoter Score, or another form of existing endorsement score, for a person regarding a product. Alternatively, if no existing score is available, some embodiments provide estimating a score of a likelihood of a person to promote or detract from a product. Thus, a user of an OSN is determined to be a recommender, a passive, or a detractor for an advertised product or service based on a promotion/detraction likelihood score of the user regarding the product.

Further, whether a user is a prospect is determined based on whether the user is a potential purchaser of an advertised product or service. A recommender is a user who is determined to be more likely to recommend than detract from a product or service. A passive is a user who is not determined to be a recommender or a detractor. A detractor is a user who is determined to be more likely to detract from than recommend a product or service. A prospect is a user whose purchase decision is determined to be positively or negatively influenced by receiving a recommendation or detraction, respectively. In various embodiments, a prospect is a user who is either in the process of making a purchase decision or who is otherwise considering purchasing a product or service. For example, a prospect considering a purchase decision for a product is influenced positively by the prospect receiving a recommendation for the product, and the prospect purchases the product. Conversely, a prospect considering a purchase receives a detracting opinion of a detractor and is dissuaded from making the purchase. In one embodiment, it is determined whether a user is a prospect and also whether the user is a recommender, a passive, or a detractor. For example, a first user and a second user are each determined to be one of a recommender, a passive, or a detractor. In this case, the first user is determined to be a prospect and the second user is determined not to be a prospect. In one embodiment, a user who is a recommender with respect to a first product is a detractor with respect to a second product.

Embodiments provide for generating one or more groups, each of which includes one or more users of the OSN. Each group member is a recommender or a detractor and each group member is, in some cases, also be a prospect. A group includes any combination of recommenders, prospects, or detractors. In various examples, a group includes at least one of a recommender, a prospect, or a detractor. In one embodiment, a group includes one or more recommenders and one or more prospects and, in another embodiment, the group also includes one or more detractors. In one example, a group including a recommender, a prospect, and a detractor is assembled for the purpose of sparking debate among the group members. For example, the debate is between two models of a product. Alternatively, the debate is between two competing brands or products offered by a single advertiser. In some embodiments, a group includes at least one group member who serves as a conversation catalyst in that the group member has a high likelihood of promoting the initiation of or continuation of conversation. Such a catalyst group member is identified based on a previous pattern of conversational activity of the group member. For example, a user with high conversational activity is added to a group as a catalyst group member, wherein the conversational activity is, in various examples, activity within other groups or activity in other areas of the OSN.

Some embodiments provide that group members are related or associated with one another. A relation between two users of an OSN is, in one embodiment, a relationship within social network between the two members. In various embodiments, a relationship is express or implied. An expressed relationship is a connection initiated by one of the members (e.g., a friend or connection request). An implied relationship is a connection determined to exist between two users based, for example, on a prior history of interaction between the users or identified commonalities between the users.

An advertisement is presented to the members of a group. The advertisement is identified as an advertisement targeted to the group. In one embodiment, the advertisement is presented to each group member within a certain time frame. In various examples, the duration of the time frame is based on the content of the advertisement, the product or service advertised, the company advertising the product or service, or other factors. Further, the duration of the time frame is, in various examples, pre-determined or algorithmically-determined.

Various embodiments provide for receiving a selection of an advertisement from a user, receiving comments about the selected advertisement from the user, presenting comments to group members, presenting comments from group members to other group members (e.g., by restricting access to comments about an advertisement to group members), or a combination thereof.

In one embodiment, viewing a group advertisement is an impression. In the context of advertising, an impression is a measure of the number of times an advertisement is presented to users. In one embodiment, an impression is measurement of responses to a request from a device of a user, which is filtered from robotic activity and error codes, and is recorded at a point as close as possible to an opportunity to see the page by the user. Under the cost per impression (CPI) model, the cost of advertising is determined based on the number of impressions of the advertisement. In one embodiment, providing an advertisement to a group member counts as at least one impression. For example, an advertisement presented to two group members is counted as two impressions. In one embodiment, a user accessing a group discussion about an advertisement is counted as an impression. In one embodiment, an impression is weighed based on the scores of the group members. For example, a group member who is a prospect views a discussion about an advertisement in which other group members are participating. In this case, the number of impression for which the prospect viewing the discussion counts is based on (i) the average recommender-detractor score of the other group members being above a pre-determined threshold, (ii) the average score of the group members who have participated in the discussion being above a pre-determined threshold, (iii) the number of recommenders in the group, (iv) the proportion of recommenders to detractors, (v) whether the prospect participates in the discussion and, if so, the content of any comments provided by the prospect, or any combination thereof. In one embodiment, the number of impressions for each viewing (or other access) by a user to an advertisement or discussion is reduced for viewings (or accesses) subsequent to the first. In one embodiment, the selection of an advertisement for presentation to a user is based on the degree to which the user has been exposed to the product previously. For example, a user who has viewed, for a first product, a first advertisement, a second advertisement, and a discussion regarding the first advertisement is determined to have a high degree of exposure to the first product, based on which an advertisement for a second product is selected for presentation to the user.

The implementation of the embodiments previously discussed can take multiple forms and are exemplified in detail through the Figures below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
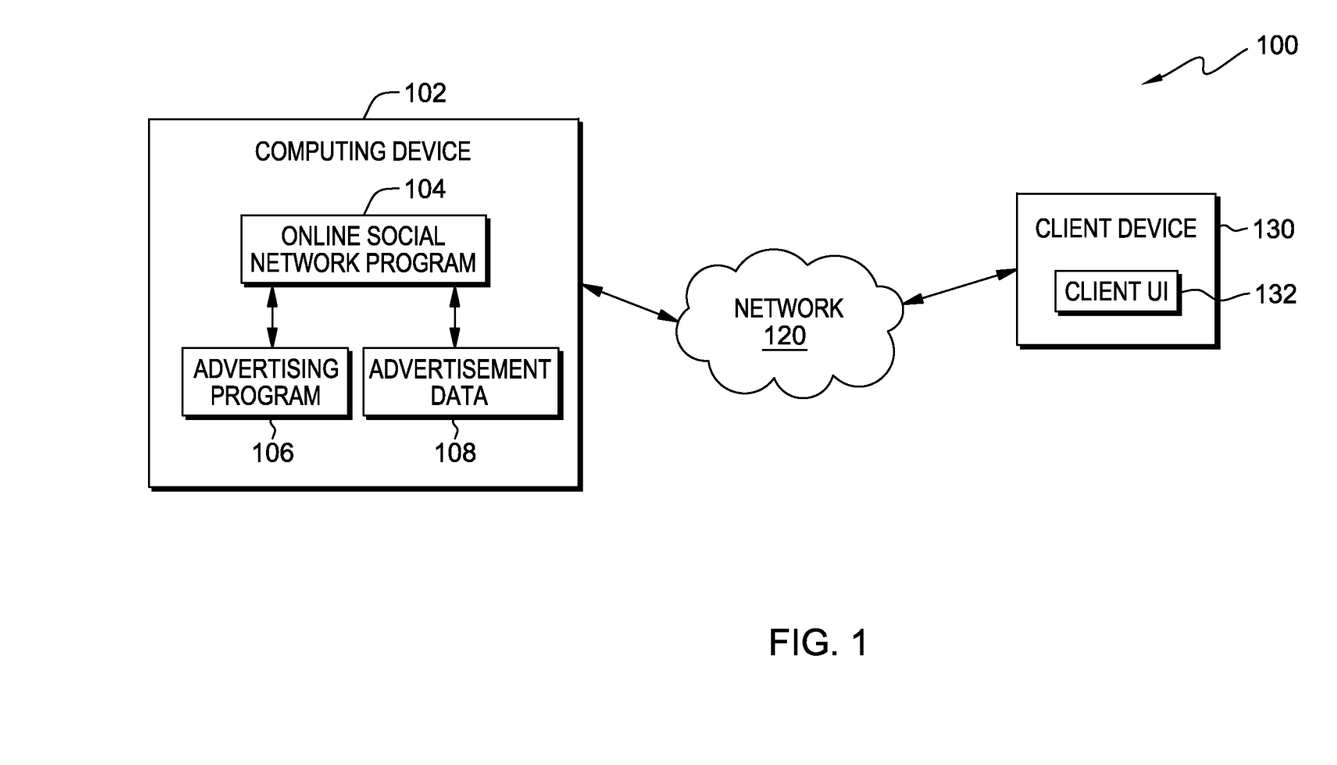
FIG. 1 is a functional block diagram illustrating a computing environment, in accordance with an embodiment of the present disclosure.

The present disclosure will now be discussed in detail with reference to the figures. FIG. 1 is a functional block diagram illustrating computing environment 100, specifically a social networking environment, in accordance with an embodiment of the present disclosure. Computing environment 100 includes computing device 102 and client device 130, both connected over network 120. Computing device 102 includes online social network (OSN) program 104, advertising program 106 and advertisement data 108. Client device 130 includes client user interface (UI) 132.

In various embodiments of the present disclosure, each of computing device 102 and client device 130 may be a desktop computer, a laptop computer, a tablet computer, a specialized computer server, a smartphone, or any other computer system known in the art. In certain embodiments of the present invention, each of computing device 102 and client device 130 is representative a computer system utilizing clustered computers and components that act as a single pool of seamless resources when accessed through network 120, as is common in data centers and with cloud computing applications. In general, each of computing device 102 and client device 130 is representative of any programmable electronic device or combination of programmable electronic devices capable of executing advertising program 106, accessing advertisement data 108, and accessing an OSN provided by OSN program 104. In general, client device 130 can be any computing device or a combination of devices with access to, and capable of executing advertising program 106 and that is capable of requesting, receiving and passing information to and from OSN program 104. Each of client device 130 and computing device 102 include internal and external hardware components, as depicted and described in FIG. 4.

In this exemplary embodiment, OSN system 104, advertising program 106 and advertisement data 108 are stored on computing device 102. In other embodiments, one or more of OSN program 104, advertising program 106 and advertisement data 108 may reside on another computing device, provided that each can access and is accessible by each other of OSN program 104, advertising program 106 and advertisement data 108. In this exemplary embodiment, client UI 132 is stored on client device 130. In other embodiments, client UI 132 may reside on another computer device, provided that it is accessible by OSN program 104, advertising program 106 and advertisement data 108. In yet other embodiments, one or more of OSN program 104, advertising program 106, advertisement data 108, and client UI 132 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that supports communications between computing device 102 and client device 130, in accordance with a desired embodiment of the present invention.

OSN program 104 resides on computing device 102 and, in one embodiment, operates to provide an OSN. In some embodiments, OSN program 104 facilitates the maintenance of social network contacts and the communication or sharing of information between such contacts. As used herein, a connection is the link shared between two users of an OSN. For example, a connection exists between a user of the OSN and other users of the OSN on a list of friends or contacts of the user, which indicates the other users of the OSN to whom the user is linked by a connection. As used herein, a contact is the person on either side of a connection. In various examples, a user is connected to another user who is an acquaintance, a co-worker, a friend, a parent, a child, a classmate, or a spouse. In other examples, the user is connected to another user through personal, business- or work-related interactions. In one embodiment, computing device 102 is a server computer system accessible to a plurality of users of OSN program 104, including a user of client device 130. In one such embodiment, client UI 132 may be a user interface by which a user (e.g., a user of client device 130) accesses an OSN provided by OSN program 104 via network 120. In various embodiments, received communications and information are presented to the user of computing device 102 by way of client UI 132 and messages and instructions are received from the user by way of client UI 132.

In one embodiment, OSN program 104 of computing device 102 allows OSN users to share messages and content with other users and with groups of the OSN. OSN program 104 coordinates the sending and receiving of shared messages and content among OSN users. In one embodiment, OSN program 104 receives content, messages and information from individual users. OSN program 104 sends the received content, messages and information to other OSN users. In various embodiments, the content includes text content, media rich content, such as audio, pictures and video, or a combination thereof. The messages also include, for example, links to websites or profiles of other users. In another example, such messages include, at least in part, information concerning recent activity performed by users of the OSN like updating a profile, joining a group, and recommending posts within the OSN.

In one embodiment, advertising program 106 operates to present an advertisement to group members of an OSN. In this embodiment, advertising program 106 selects an advertisement (e.g., an advertisement of advertisement data 108). Advertisement selection considers the potential effectiveness of an advertisement for a group. As an example, advertisement data 108 includes two advertisements: an advertisement for vehicle A and an advertisement for vehicle B. In this example, a group for which advertisement program 106 selects an advertisement includes a greater number of vehicle A promoters than vehicle B promoters, so advertisement program 106 presents the advertisement for vehicle A to the assembled group. In one embodiment, advertising program 106 selects an advertisement that is most likely to result in a positive influence to a purchase decision by a prospect based on the sentiment of each user of the group. For example, advertising program 106 assembles a group that includes a prospect, one or more recommenders who have a high degree of influence on the prospect, and no detractors (or, alternatively, only detractors with low degrees of influence on the prospect). In this example, advertising program 106 selects an advertisement from among advertisements that promote one or both of a product for which the user is making the purchase decision or a product related thereto (e.g., a competing product). Further, advertising program 106 selects an advertisement for which the assembled group has the highest degree of influence over the purchase decision of the prospect.

In one embodiment, advertising program 106 operates to determine a category for a user of the OSN (e.g., recommender, prospect, or detractor) based, for example, on recommender-detractor score of the user in relation to a product or service. In various examples, the score is based on a probability of a user to express a positive or negative opinion regarding a product or service, a probability of a user to purchase or express a level of satisfaction with a certain product or service, or other attitudes or tendencies of a user in relation to a product or service, such as those explained above.

In one embodiment, advertising program 106 operates to group users of an OSN (e.g. based on relationships of the users, a category or score of each user, or a combination thereof). The group includes one or more members from at least one category. In other embodiments, advertisement program 106 selects recommenders and prospects.

In one embodiment, advertising program 106 operates to present an advertisement to the group members. In one embodiment, advertising program 106 presents the advertisement to each group member at various times within a given time frame. In some embodiments, the time frame is specified in order to make it more likely for the group members to feel that the other group members have seen the advertisement once the discussion begins. In such an embodiment, the specific time frame increases the probability of a more robust discussion including more contributions from individual group members. In various examples, the time frame is measured in whole or fractional minutes, hours, days, weeks, or other time periods. For example, a department store has a forty-eight hour sale on jeans over a holiday weekend. The advertisement begins to run seven days prior to the start of the sale. The advertisement stops running at the end of the forty-eight hour period. In this example, one group member signs in to the OSN and is presented with the advertisement immediately on the first day the advertisement is running, whereas another group member does not log on and is not presented with the advertisement until the fifth day that the advertisement is running. In another example, the first 200 customers to purchase the newest smartphone on Cyber Monday receive a fifty percent discount on the item. The advertisement runs from Black Friday until the end of Cyber Monday. All group members are presented with the advertisement during the few days the advertisement runs given they log on to the OSN. As another example, a jewelry company has a continuous "buy one necklace, get the second necklace free" sale. No time constraint is placed on the advertisement running, so one group member is presented with the advertisement on the first day it begins running and another group member is presented with the advertisement twelve days later. In one embodiment, advertising program 106 further operates to receive comments regarding the advertisement. In one embodiment, advertising program 106 presents comments received from individual group members to one or more other members of the group. In another embodiment, advertising program 106 functions to receive the advertisement from advertisement data 108.

Advertisement data 108 is a database of information relevant to the distribution of advertisements. In one embodiment, advertisement data 108 includes information for each user of an OSN (e.g., an OSN maintained by OSN program 104). In this embodiment, advertisement data 108 includes information that advertising program 106 uses during classification and group assembly, including past activity of one or more users. For example, the past activity of a user includes online activity in relation to products contained in advertisements a user has viewed, shared or recommended to other users. The past activity of a user includes information such as, for example, comments, content provided, whether that content was private or shared with other OSN users, the content of others users that the user viewed, the amount of time spent on the OSN by the user, and past activity of all the contacts of that user. In one embodiment, advertisement data 108 includes metadata for each of one or more advertisements identifying a product or service corresponding to the advertisement. In another embodiment, the metadata for an advertisement identifies a time frame during which the advertisement is to be presented. In another embodiment, advertisement data 108 includes multiple versions of each advertisement specific to individual group members. For example, a version of an advertisement for a recommender identifies a referral code and offers a referral bonus to the recommender if another group member (e.g., a prospect) purchases the advertised product using the referral code. In this example, a version of an advertisement for a prospect does not include the referral code and referral bonus offer. Conversely, for example, the advertisement for a prospect includes a different offer, such as a ten percent discount for new customers. In one embodiment, an advertisement for a detractor includes a falsely-competing product for the purpose of sparking a debate initiated by the detractor. For example, Model A and Model B are both long distance running shoes sold by the same company, but vary in design. In this example, both models are advertised to members of a group including a group member who is a detractor in relation to Model A to increase the probability of the detractor initiating a discussion concerning the two models.

Figure 2:
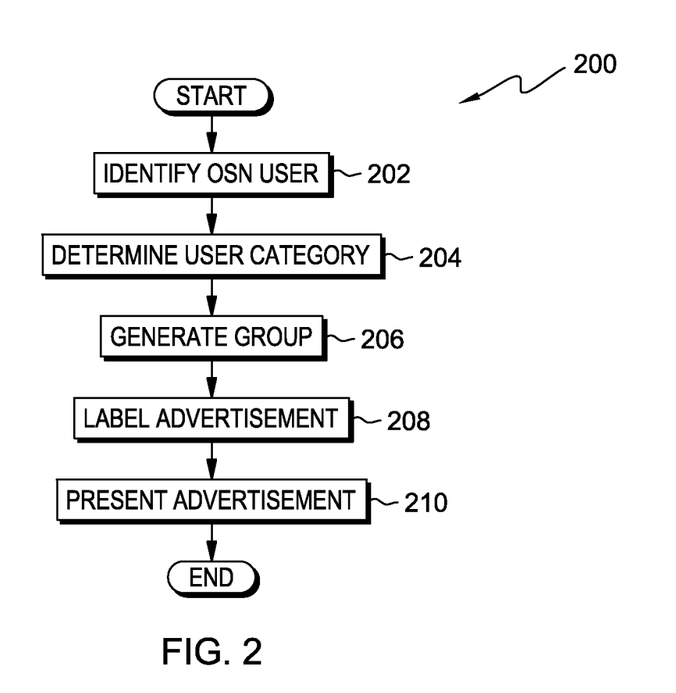
FIG. 2 is a flowchart depicting operations for an advertising program, on a computing device within the computing environment of FIG. 1, in accordance with an embodiment of the present disclosure.

FIG. 2 is a flowchart depicting the operational process of advertising program 106 on computing device within the computing environment 100, in accordance with an embodiment of the present disclosure.

In process 204, advertising program 106 determines a category of each user of the OSN. In one embodiment, advertising program 106 determines the category of a user based on a sentiment of the user. For example, advertising program 106 determines a sentiment of a user based on the user data (e.g., profile content) of the user. In various examples, the sentiment of a user indicates a likelihood of the user to express a recommendation, express a detracting opinion, or make a purchase decision. In this embodiment, advertising program 106 determines a category for a user by comparing the sentiment of the user to one or more pre-determined thresholds of each category. For example, a sentiment for a user indicates an eighty-five percent likelihood that the user recommends a product, a ten percent likelihood that the user makes a purchase decision regarding the product, and a seven percent likelihood that the user expresses a detracting opinion regarding the product. Further, the pre-determined thresholds include: for the recommender category, an eighty percent likelihood to recommend the product; for the prospect category, a seventy-five percent likelihood to make a purchase decision; and for the detractor category, a sixty percent likelihood to express a detracting opinion. In this case, advertising program 106 compares the sentiment of the user to the thresholds of each category and determines that the category of the user is recommender. In another embodiment, a user does not exceed the threshold of any categories, in which case advertising program 106 does not determine the user to belong to any of the categories. In one embodiment, advertising program 106 determines a sentiment of a user. For example, advertising program 106 determines the sentiment based on information shared by a user in the OSN, including past activity of the user. In one example, based on a sentiment of a first user that indicates a high probability of the first user to recommend a product, advertising program 106 classifies the first user as a recommender. In another example, based on a sentiment of a second user that indicates a high probability of a second user to provide negative comments about a product, advertising program 106 classifies the second user as a detractor. In another example, based on a sentiment of a third user indicating a likelihood of the third user to make a purchase decision regarding the product, advertising program 106 classifies the third user as a prospect. In one embodiment, advertising program 106 determines a category for a user based, at least in part, on a relationship between the user and one or more other users in the OSN. In this case, the relationship includes a frequency of interactions between the user and the one or more other users, the number of times the user visits the profile of each of the one or more other users, and the number of likes, photos, and links concerning a product or service of each of the user and the one or more other users.

In some embodiments, the sentiment of a user includes a degree of influence of a user, which is a measure of how influential an opinion of the user is on the purchase decisions of a prospect. A user with a high degree of influence is more likely to sway a purchase decision of a prospect relative to a user with a low degree of influence. In one embodiment, advertising program 106 compares the degree of influence of a member to one or more predetermined thresholds when selecting users for a group. For example, a group includes a recommender having a high degree of influence (e.g., a degree of influence above a predetermined threshold) and a detractor having a low degree of influence (e.g., a degree of influence below a predetermined threshold). In one embodiment, advertising program 106 balances the recommenders and detractors within in a group such that, collectively, the recommenders have a higher degree of the influence than the detractors. Advertising program 106 determines a degree of influence of a user based on the purchase decisions made by other users after being exposed to an opinion (e.g., viewing a comment or message containing the opinion) of the user. In one embodiment, advertising program 106 determining the degree of influence of a user includes utilizing statistical methods to determine the statistical significance of the effect of the opinion of the user, thereby reducing the effect of confounding factors or other extraneous variables. In another embodiment, the degree of influence of a user is based, at least in part, on how likely the user is to provide an opinion. In another embodiment, the degree of influence of a user is particular to one or more other users. For example, advertising program 106 determines that a first user has a high degree of influence for purchase decisions of a second user, but a low degree of influence for purchase decisions by a third user. In this case, advertising program 106 creates a group including the first user, the second user, and a fourth user that has a low degree of influence for purchase decisions of the second user.

In process 206, advertising program 106 generates a group of users based, at least in part, on a category of each user. In one embodiment, the group includes a plurality of OSN users who share common connections or already have established relationships with each other and each fall into at least one of the recommender category, the prospect category, and the detractor category in relation to a certain product or service. Advertising program 106 selects group members based, at least in part, on the classification occurring in process 204. For example, advertising program 106 selects an assortment of recommenders and prospects. The selection is in accordance with a configured group size, which includes, for example, a minimum and maximum number of group members of each category. In one embodiment, each of the minimum number and the maximum number are operator-configured. The minimum and maximum numbers contribute to a specified ratio of each of the recommenders and each of the prospects that are required in each group. In another embodiment, advertising program 106 selects a number of recommenders and prospects is based, at least in part, on the relationships between the group members in the OSN. For example, advertising program 106 selects a large number of group members in order to obfuscate the selection of group members to other users in the group. In yet another embodiment, advertising program 106 biases restrictions on group size toward groups small enough so that group members recognize one another, thereby increasing the chance of a group members contributing to group discussion. In one embodiment, advertising program 106 generates a group based, at least in part, on the connections, relationships, and frequency of interactions among users. In another embodiment, the configured group size includes a proportion of recommenders to prospects.

For example, a group has at least ten recommenders to every two prospects. In another example, a configuration specifies a group of at least four prospects when there are twelve recommenders in a group. In one example, advertising program 106 receives user input specifying a configured group size from a user (e.g., a user of client device 130, via client UI 132). In other examples, advertising program 106 receives the configuration of the group size by retrieving the configuration from a database, such as advertisement data 108, or by algorithmically determining the configuration. In some embodiments, advertisement program 104 determines generates a group based, at least in part, on a group member recommending or purchasing a product.

In process 208, advertising program 106 labels an advertisement. In one embodiment, the label identifies to a group member one or more of the other group members who receive the advertisement. In one embodiment, the advertisement presents the names of the other group members to whom the advertisement is presented. For example, the group member receiving the advertisement is presented with the names of the one or more other group members who have also received the advertisement (or a version of the advertisement). For example, the group member receiving the advertisement is presented with the names of the one or more other group members who also receive the advertisement (or a version of the advertisement). In one embodiment, the recipients have a shared connection with one another, which increases the probability of a recommender within the group recommending the advertised products to other group members. In some embodiments, advertising program 106 presents the advertisements in the form of a group advertisement container, which contains separate but similar advertisements to be presented to each group member. For example, two advertisements are complimentary. For example, a group advertisement container includes an advertisement for surfboards and the same group advertisement container includes an advertisement for wetsuits. A discussion concerning both products is more likely to generate positive recommendations or detractions, respectively, due to the similarity of the products advertised.

In process 210, advertising program 106 presents each group member with the labeled advertisement. Advertising program 106 presents the advertisement in a time frame corresponding to the advertisement (e.g., the time frame stored in advertisement data 108 in the metadata of the advertisement). For example, the timeframe is dependent on the advertisement topic. For example, the OSN (or, alternatively, advertising program 106) presents an advertisement to each group member within the same day. Alternatively, the OSN (or, alternatively, advertising program 106) presents an advertisement to each group member days apart from each other. In one embodiment, advertising program 106 receives a user selection of an advertisement. In some embodiments, advertising program 106 receives a comment from a group member in relation to an advertisement and, in response, presents the advertisement to other group members. In certain embodiments, advertising program 106 adjusts the time at which the OSN (or, alternatively, advertising program 106) presents the advertisement to group members who have not yet seen the advertisement. For example, advertisement program 106 presents the advertisement to prospects within twenty-four hours rather than forty-eight hours in response to the first group member viewing the advertisement, wherein the original time frame is forty-eight hours. In certain embodiments, the OSN (or, alternatively, advertising program 106) presents two competing advertisements to a group member. At least one of those advertisements is a group advertisement described herein. In certain embodiments, the OSN (or, alternatively, advertising program 106) accounts for whether group discussion has already begun regarding a certain advertisement when determining the time at which the group member is presented with the advertisement. In some embodiments, the extent an advertisement generated discussion in other groups is also considered when determining the time at which an advertisement is presented.

Figure 3:
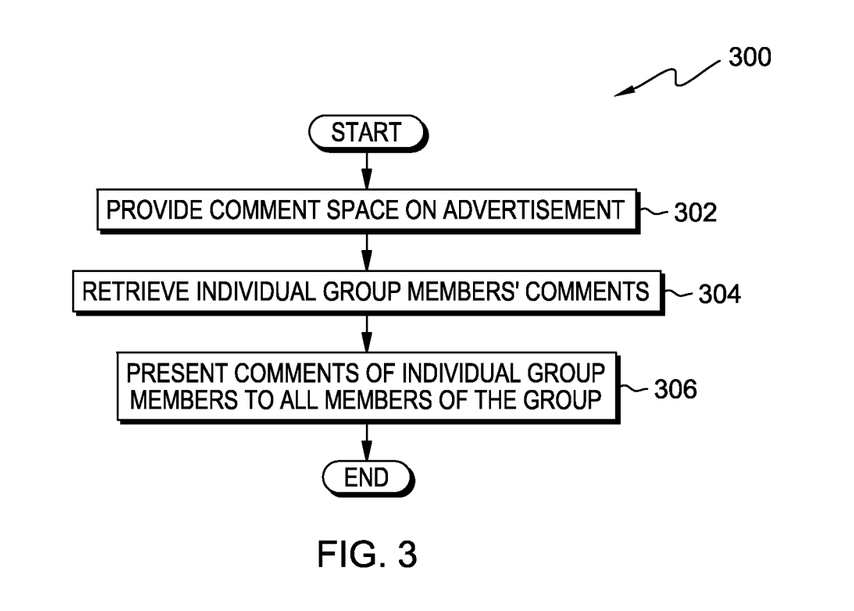
FIG. 3 is a flowchart depicting additional operations of the advertising program, on a computing device within the computing environment of FIG. 1, in accordance with an embodiment of the present disclosure.

FIG. 3 is a flowchart depicting operations for executing additional steps of advertising program 106, on a computing device within the computing environment of FIG. 1, in accordance with an embodiment of the present disclosure. As an example, FIG. 3 is a flowchart depicting operations 300 of advertising program 106, on computing device 102 within computing environment 100.

In process 302, advertising program 106 further operates to provide comment space for a group member. For example, the group member comments on a particular advertisement via a comment box presented with the advertisement. For example, advertising program 106 or OSN program 104 provides the comment box in conjunction with a given advertisement. In other embodiments, the comment box is provided (by, e.g., the OSN or advertising program 106) alongside the advertisement. In other embodiments, the comment box is provided (by, e.g., the OSN or advertising program 106) separately from the advertisement. The comment box contributes to the likelihood of a group member recommending or purchasing a product. The comment box prompts a group member to provide feedback concerning the product displayed in the advertisement.

In process 304, advertising program 106 receives comments made by individual group members. In one embodiment, advertisement program 106 receives the comments as user input (e.g., from a user of user device 130 via client UI 132) via a comment space provided by advertising program 106. In other embodiments, advertising program 106 determines that a group member has provided a comment and, in response, advertising program 106 receives the comment. In some embodiments, advertising program 106 stores the comment in advertisement data 108.

In process 306, advertising program 106 presents the comments of individual group members to each of the other group members. Advertising program 106 restricts the viewing capacity of the comments to group members only. In one embodiment, the restriction on viewing ability increases the likelihood that group members contribute to group discussion on a certain advertisement topic.

Figure 4:
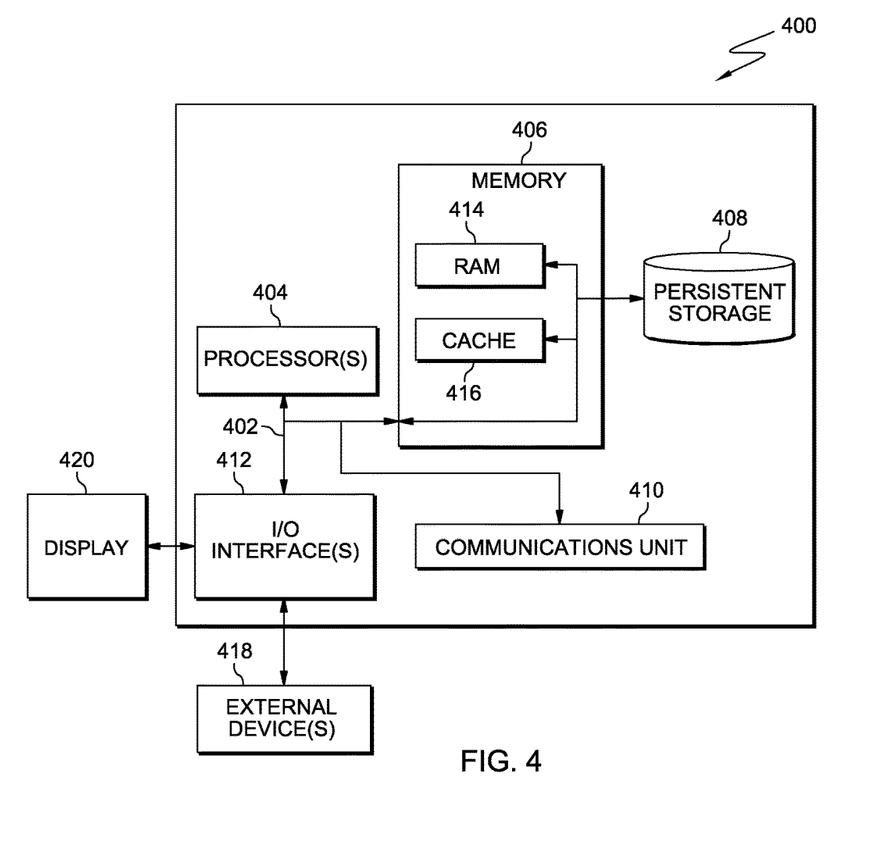
FIG. 4 is a block diagram of components of a computing device executing operations of an advertising program, in accordance with an embodiment of the present disclosure.

FIG. 4 is a block diagram of components of the computing device executing operations for targeting advertisements within a social network, in accordance with an embodiment of the present disclosure. For example, FIG. 4 is a block diagram of computing device 102 within computing environment 100 executing operations of advertising program 106.

It should be appreciated that FIG. 4 provides only an illustration of one implementation and does not imply any limitations with regard to the environments in which different embodiments may be implemented. Many modifications to the depicted environment may be made.

Computing device 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

In various embodiments, OSN program 104 is stored in persistent storage 408 for execution and/or access by one or more of the respective computer processors 404 via one or more memories of memory 406. Advertising program 106 is stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 120. In these examples, communications unit 410 includes one or more network interface cards. Communications unit 410 may provide communications through the use of either or both physical and wireless communications links. Each of OSN system 104 and advertising program 106 may be downloaded to persistent storage 408 through communications unit 410.

I/O interface(s) 412 allows for input and output of data with other devices that may be connected to computing device 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention (e.g., advertising program 106 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for altering a viewing capacity of content displayed on a user profile via an online social network, the method comprising:
    generating, by one or more computer processors, a group of user profiles of an online social network based, at least in part, on:
        (i) a first likelihood of a first user having a first user profile in the online social network to recommend a purchase of a product to a second user having a second user profile in the online social network based, at least in part, on a pattern of purchasing the product over a period of time; and
        (ii) a second likelihood of the first user having the first user profile in the online social network to promote an initiation of a conversation about the product to the second user having the second user profile via the online social network based, at least in part, on a pattern of conversational activity about the product within the online social network;
    generating, by one or more computer processors, a first comment box in conjunction with an advertisement displayed to the first user profile via the online social network;
    presenting, by one or more computer processors, the advertisement on the second user profile of the online social network based, at least in part, on receiving a comment from the first user in relation to the advertisement;
    generating, by one or more computer processors, a second comment box in conjunction with the advertisement displayed to the second user profile via the online social network; and
    presenting, by one or more computer processors, comments entered via the first comment box and the second comment box to the group of user profiles in the online social network, wherein a viewing capacity of the comments about the advertisement entered via the first comment box and the second comment box is restricted to the group of user profiles of the online social network.

2. The method of claim 1, further comprising:
    receiving, by the one or more processors, a first opinion about the product via the comment box;
    determining, by the one or more processors, that the first opinion about the product is negative; and
    restricting a viewing capacity of the first opinion from a third user of the online social network.

3. The method of claim 1, further comprising:
    displaying, by the one or more processors, a second opinion about the product generated via the comment box on the second user profile;
    determining, by the one or more processors, that the second opinion about the product is positive; and
    displaying, by the one or more processors, the second opinion to a fourth user of the online social network when viewing the second user profile.

4. The method of claim 1, further comprising:
 determining, by the one or more processors, a category of a user of the online social network selected from the group consisting of a promoter, detractor, and prospect of the product.

5. The method of claim 4, wherein the category of the user is determined based, at least in part, on:
 determining, by the one or more processors, a sentiment of the user with respect to the product; and
 comparing, by the one or more processors, the sentiment of the user to one or more thresholds for the category.

* * * * *